(12) United States Patent
Nitschke et al.

(10) Patent No.: US 9,993,741 B2
(45) Date of Patent: Jun. 12, 2018

(54) SYSTEM AND METHOD TO REFURBISH THE NON-CONVECTIVE ZONE IN A SALINITY GRADIENT SOLAR POND

(71) Applicant: Good Earth Mechanics, LLC, New Ipswich, NH (US)

(72) Inventors: George Samuel Nitschke, New Ipswich, NH (US); Huanmin Lu, El Paso, TX (US)

(73) Assignee: Good Earth Mechanics, LLC, New Ipswich, NH (US)

( * ) Notice: Subject to any disclaimer, the term of this patent is extended or adjusted under 35 U.S.C. 154(b) by 295 days.

(21) Appl. No.: 14/736,451

(22) Filed: Jun. 11, 2015

(65) Prior Publication Data

US 2016/0001194 A1    Jan. 7, 2016

Related U.S. Application Data

(60) Provisional application No. 62/010,576, filed on Jun. 11, 2014.

(51) Int. Cl.
| | |
|---|---|
| *B01D 1/02* | (2006.01) |
| *B01D 1/00* | (2006.01) |
| *F24J 2/34* | (2006.01) |
| *F24J 2/42* | (2006.01) |
| *F24J 2/46* | (2006.01) |
| *B01D 3/02* | (2006.01) |
| *C01D 3/06* | (2006.01) |

(52) U.S. Cl.
CPC .......... *B01D 1/0035* (2013.01); *B01D 1/0064* (2013.01); *B01D 3/02* (2013.01); *C01D 3/06* (2013.01); *F24J 2/34* (2013.01); *F24J 2/42* (2013.01); *F24J 2/46* (2013.01); *Y02A 20/212* (2018.01)

(58) Field of Classification Search
CPC ...... B01D 1/0035; B01D 1/0064; B01D 1/02; F24J 2/34; F24J 2/42; F24J 2/46
See application file for complete search history.

(56) References Cited

U.S. PATENT DOCUMENTS 3,372,691 A * 3/1968 Shachar ................. F24J 2/0466
126/561
4,333,736 A * 6/1982 Shachar ............... B01D 9/0031
23/295 S

(Continued)

*Primary Examiner* — Jonathan Miller
(74) *Attorney, Agent, or Firm* — Bay State IP, LLC (57) ABSTRACT

A Salinity Gradient Solar Pond (SGSP) has saturated salt water in the bottom zone of the pond and nearly fresh water at the top zone, with a gradient zone between the top and bottom. Due to this salinity stratification the upward diffusion of salt is a natural consequence in SGSP's. Controlling the salinity gradient in SGSP systems is vital to their reliable operation. The method for controlling the salinity gradient disclosed in this application, coined the "Pond Rolling Method" by the authors, rapidly drains the pond's non-gradient zones, refurbishes the gradient, and restores the non-gradient zones of the SGSP system, in a manner that minimizes land use, water and heat loss. The salt in the pond is allowed to diffuse upward over time and, on condition as needed to restore the gradient, the Pond Rolling Method is used to completely rebuild the gradient and the SGSP zones.

4 Claims, 6 Drawing Sheets

(56) References Cited

U.S. PATENT DOCUMENTS

| | | | | |
|---|---|---|---|---|
| 4,446,025 A | * | 5/1984 | Assaf | E02D 29/077 119/212 |
| 4,479,486 A | * | 10/1984 | Manning | E21B 41/005 126/561 |
| 4,498,300 A | * | 2/1985 | Assaf | F03G 6/00 126/561 |
| 4,541,244 A | * | 9/1985 | Assaf | F24J 2/0466 126/400 |
| 4,621,612 A | * | 11/1986 | Nakamoto | F24J 2/0466 126/400 |
| 2004/0098998 A1 | * | 5/2004 | Kinoshita | F24J 2/0466 62/238.3 |

* cited by examiner

SYSTEM AND METHOD TO REFURBISH THE NON-CONVECTIVE ZONE IN A SALINITY GRADIENT SOLAR POND

CROSS REFERENCE TO RELATED APPLICATION

This application takes priority from and claims the benefit of U.S. Provisional Patent Application Ser. No. 62/010,576 filed on Jun. 11, 2015, the contents of which are herein incorporated by reference.

BACKGROUND OF THE INVENTION

Field of the Invention

The present system and method relates generally to the practice of maintaining the salinity gradient in a Salinity Gradient Solar Pond (SGSP), and more particularly to a system and method to refurbish the non-convective zone in a SGSP.

Description of the Related Art

Figure 1:
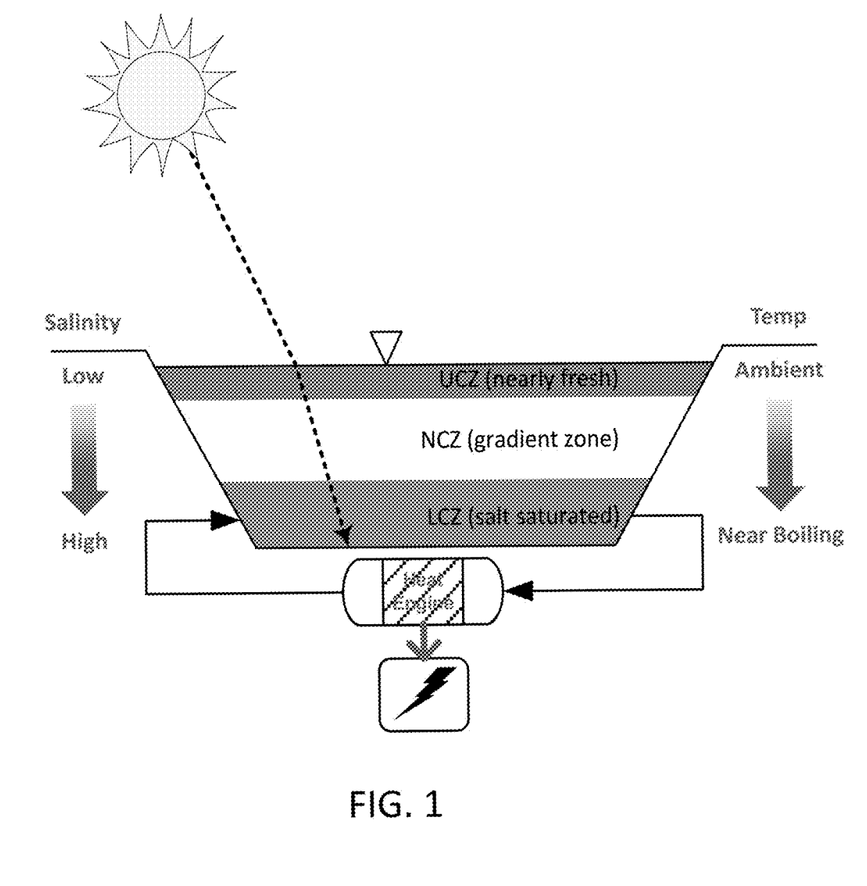
FIG. 1 illustrates a perspective diagram of the basic workings of an exemplary Salinity Gradient Solar Pond (SGSP).

An SGSP is a shallow, salt-gradient pond that enables the collection and storage of solar thermal energy (see FIG. 1). In the SGSP, solar energy is absorbed by the pond's bottom which in turn heats the adjacent salt-saturated fluid (the "Lower Convective Zone", or LCZ, in FIG. 1). Since the LCZ is heavier than the layers above it due to its higher salinity, the heated fluid cannot rise in the pond and cool, like a normal pond, but rather remains on the bottom, getting hotter as it stores more solar thermal energy. Over time, typically several months from initial construction, as the LCZ stores more and more solar thermal energy, the brine temperature will approach boiling. This collected and stored solar thermal energy may be withdrawn (pumped hot brine) as process heat which may be used to generate electricity using an off the shelf, low-temperature heat engine.

The SGSP may collect and store heat, and deliver power at an average, uniform rate (base-load), or it may deliver power on an as needed basis (on-demand) giving distribution control of the power output rather than being forced to produce power solely when the wind blows or the sun shines, making SGSP systems many times more effective than intermittent renewables. The SGSP systems may be easily constructed over large areas.

SUMMARY OF THE INVENTION

The instant system and method, as illustrated herein, is clearly not anticipated, rendered obvious, or even present in any of the prior art mechanisms, either alone or in any combination thereof. Thus the several embodiments of the instant system and method are illustrated herein.

The present system and method, a Pond Rolling Method, provides an efficient means for practicing gradient maintenance in a Salinity Gradient Solar Pond (SGSP) power system. The Pond Rolling Method is more efficient than previously practiced methods for SGSP gradient maintenance, e.g., the Surface Wash method, and that improved efficiency is essential for the commercial practice of SGSP power systems. The commercialization of the SGSP technology is vital to the renewable energy industry, particularly as intermittent renewables are leading to grid management issues and increased costs. The SGSP systems collect and store heat, and are able to deliver power at an average, uniform rate (base-load), or on an as needed basis (on-demand) giving distribution control of the power output rather than being forced to produce power solely when the wind blows or the sun shines. This feature, along with other synergistic benefits which Good Earth Mechanics, LLC (GEM) has developed (e.g., large-scale salt sink for environmental remediation), make SGSP systems many times more effective than intermittent renewables. The GEM team is presently engaged in the commercial launch of their SGSP technology and the disclosed invention herein is crucial to that commercial launch. The Pond Rolling Method, along with the previously disclosed Falling Pond system and practice to enable the Falling Pond Method, gives GEM positive control of the salinity gradient for commercial practice of the SGSP technology.

Figure 2A:
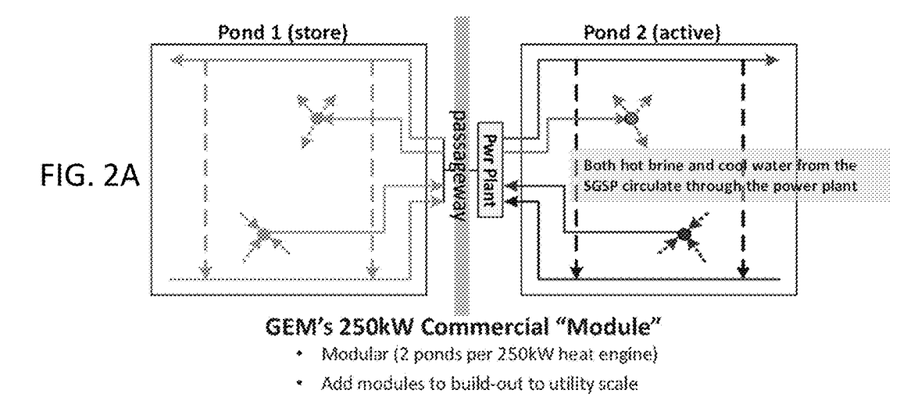
FIGS. 2A-2C illustrates one embodiment of the Good Earth Mechanics (GEM) 250 kW Commercial SGSP Module, which may utilize at least two pond units for each module.
Figure 2B:
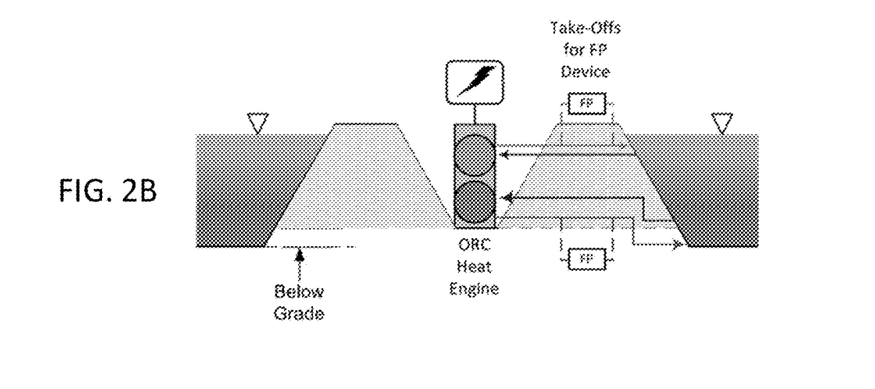
Figure 2C:
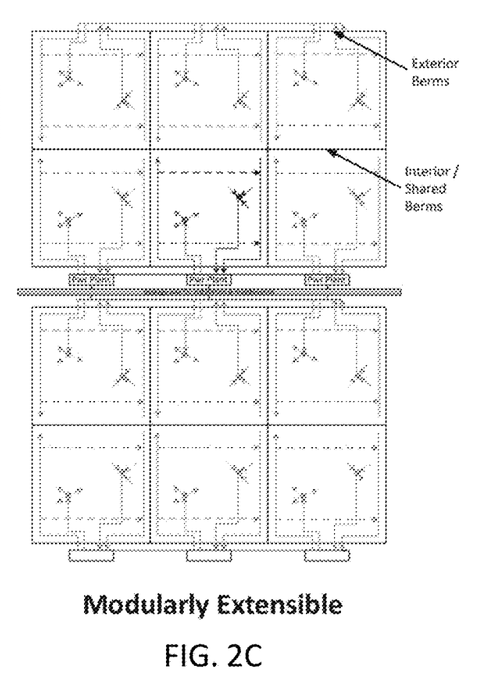

Good Earth Mechanics, LLC (GEM) is commercializing the SGSP technology. The GEM SGSP team is comprised of the principals who operated the longest running SGSP engineering development and pilot demonstration in the world to date (University of Texas, El Paso) from 1985 to 2002 (*Advancements in Salinity Gradient Solar Pond Technology Based on 16 Years of Operational Experience*, Huanmin Lu, Andrew H. P. Swift, Herbert D. Hein, Jr., John C. Walton; J. Solar Energy Eng., v. 126, p. 759-767, May 2004). GEM will build and deploy the SGSP systems using its 250 kW commercial module, which uses two pond units for each module (see FIG. 2). The ponds are bermed impoundments versus excavated holes, where the dirt from the pond centers is used to form the berms. The GEM SGSP systems are modularly extensible: the GEM SGSP power system site can be as small as 250 kW, or scaled up to hundreds of MW's, by simply adding more SGSP modules. A cutaway of the GEM SGSP system in FIG. 2 shows how a typical off-the-shelf, low-temperature Organic Rankine Cycle (ORC) heat engine circulates both the pond's hot bottom brine and cool surface water. The hot brine is the thermal source and the cool water serves as the ORC heat sink; it's the temperature difference between the bottom and the top of the SGSP system that drives the heat engine.

Due to the salinity stratification in the SGSP the upward diffusion of salt is a natural consequence. This upward diffusion of salt has been found to be in the range of 60-80 $gr/m^2/day$ (Tabor, H.; *Solar Ponds*, Solar Energy, v. 27 (3), pp. 181-194, 1981 and v. 30 (1), pp. 85-86, 1983). Controlling the salinity gradient in SGSP systems is vital to their reliable and efficient operation. The method for controlling the salinity gradient disclosed in this application, coined the "Pond Rolling Method" by the authors, enables the solar pond's upper and lower zones to be rapidly drained and stored in the corresponding zones of the surrounding ponds in the SGSP array (see FIG. 2); this minimizes the heat and water loss while efficiently utilizing the land allocated for the SGSP array. The available freeboard in the array's ponds is designed to allow for this periodically added volume, e.g., the freeboard within the array is designed for an extra ⅓ the volume of each of the upper and lower zones, in addition to the nominal freeboard to retain wind-induced wave action (i.e. for the case where the upper and lower zones of the pond under repair is stored in the surrounding three ponds, or ⅕ the added volume if stored in the surrounding five ponds, etc.). The modularity of the SGSP array, proposed for commercial practice by GEM, is key to the practice of the Pond Rolling method.

Once the pond's upper and lower zones have been pumped away, leaving only the gradient zone in the pond under repair, the gradient zone may be refurbished (procedures for doing this refurbishment are discussed under "Disclosure of Invention"). After the gradient zone has been refurbished, the volumes for the lower and upper zones are returned from the surrounding ponds. By storing the lower zone of the pond under repair in the hot lower zones of the surrounding ponds, the heat losses are minimized. Likewise storing the upper zone in the surrounding ponds minimizes water loss.

In the Pond Rolling Method the salt in the pond is allowed to diffuse upward over time and the method is used as needed to restore the gradient. Other methods used for controlling the SGSP gradient include the Surface Wash method depicted in FIG. 3.

In the Surface Wash method the salt is allowed to diffuse upward to the surface layer. As the surface layer gets saltier, it is replaced with fresh water, or "washed". The displaced salty surface water is evaporated to concentrated salt brine in a separate evaporation pond and then returned to the SGSP bottom. This method, while workable for SGSP demonstration work and the typical gradient maintenance practice heretofore, is not practical for large scale SGSP commercialization due to the additional land requirement and the higher water and heat losses required to practice the method. The Pond Rolling Method is superior as it minimizes water, heat loss, required land, and costs compared with the Surface Wash method.

There has thus been outlined, rather broadly, a system and method relates generally to the practice of maintaining the salinity gradient in a Salinity Gradient Solar Pond (SGSP), and more particularly to a system and method to refurbish the non-convective zone in a SGSP in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

These together with other objects of the invention, along with the various features of novelty, which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

DETAILED DESCRIPTION OF THE SEVERAL EMBODIMENTS

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

GEM has developed two practices to efficiently maintain the SGSP gradient in commercial operation, either of which by itself would theoretically be sufficient to maintain the SGSP gradient, whereas both methods together ensure GEM's ability to control the SGSP gradient. The first practice, a Falling Pond Device to enable the Falling Pond Method, was disclosed in an earlier Application.

Figure 4:
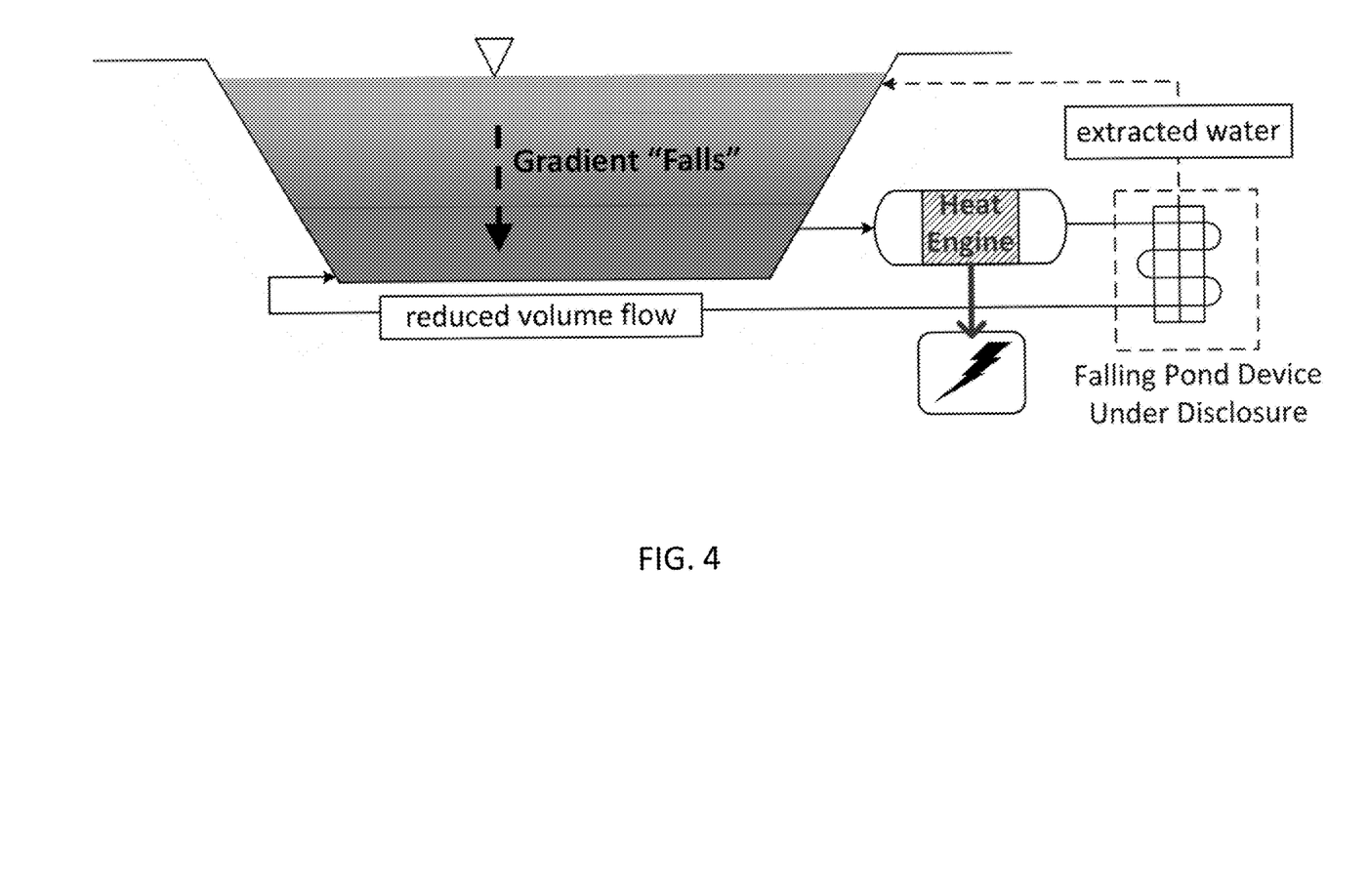
FIG. 4 illustrates one embodiment of a Falling Pond Device in operation with an SGSP system to maintain the salinity gradient.

The Falling Pond Method is depicted in FIG. 4, where the Device causes the gradient to "fall" at the same rate as the salt diffuses upward in the pond. The second practice, coined as the "Pond Rolling Method" by the authors, is the subject of this Application.

It may be shown that the velocity of the natural upward diffusion of salt is:

$$V = \frac{1}{s}\left(\kappa_s \frac{\partial s}{\partial z}\right) \quad [1]$$

where $s$ = salt concentration $\kappa_s$ = salt diffusivity ( ~ $1.55E - 09$ m$^2$/s)

$z$ = depth (m)

$V$ = velocity (m/s)

For a typical GEM 250 kW commercial SGSP "module", as depicted in FIG. 2, the diffusion velocity is approximately 1.29E-09 m/s, or ~1.6 inches per year.

The Pond Rolling Method allows that the natural diffusion of salt will occur unabated and, over time, will require the salinity gradient to be refurbished. This gradient refurbishment will be done "on condition", i.e., as needed. Nominally, the gradient will need refurbishment every three years or so (e.g., ~5 inches upward propagation of the gradient). Note that GEM's Falling Pond Device is designed to maintain the gradient in place and, if working perfectly, would negate the need for the Pond Rolling Method. However, extraneous deleterious effects to the gradient are anticipated in commercial operations (e.g., high wind events eroding the upper gradient, biota events leading to gradient instability, etc.) and the Pond Rolling Method provides a back-up plan to the Falling Pond Method for GEM's salinity gradient maintenance. Additionally, the Pond Rolling Method also enables GEM to efficiently drain and refill the solar ponds for conducting maintenance on the pond or liner.

Figure 5:
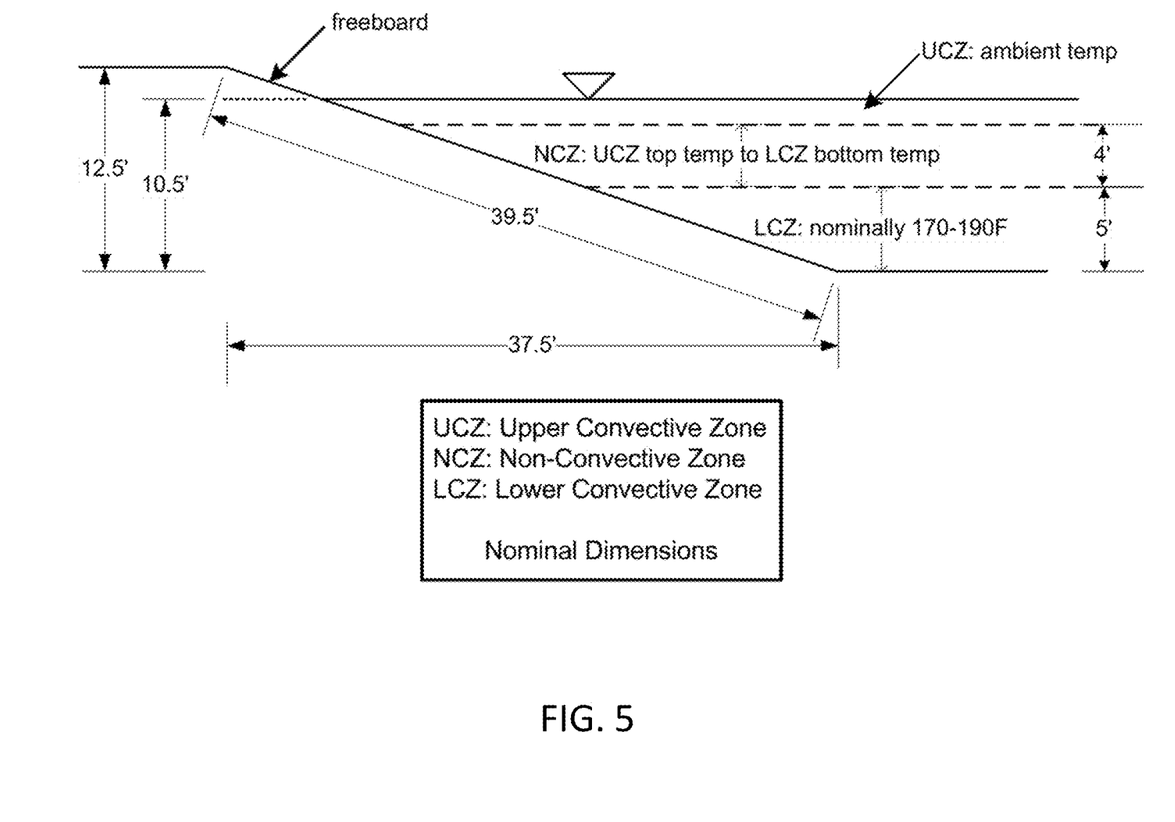
FIG. 5 illustrates a cutaway view of one embodiment of the present SGSP system, showing the typical dimensions for the pond's three layers: the Upper Convective Zone; the Non-Convective Layer; and the Lower Convective Zone.

To illustrate the Pond Rolling Method (PRM) see the cross section of a typical SGSP in FIG. 5, which shows the three distinct zones of the SGSP system: [1] the upper convective zone (UCZ), which is the ambient temperature fresh to slightly brackish homogeneous upper layer; [2] the non-convective zone (NCZ), which is the gradient layer that is to be refurbished (e.g., gradient skewed due to diffusion, mixing, etc.); and [3] the lower convective zone (LCZ), which is the high salinity, hot bottom layer that stores the solar thermal energy. The PRM is used to refurbish the NCZ in an individual pond by first draining the LCZ and UCZ from the pond in such a way as to minimize heat and water loss and required land. The NCZ is then refurbished in situ, after which the LCZ and UCZ are replaced to complete the PRM.

Figure 6A:
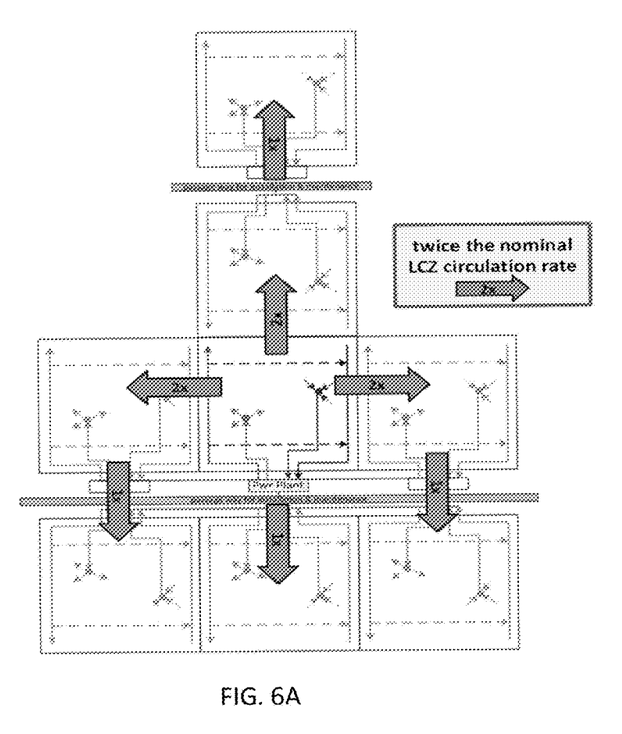
FIGS. 6A-6C illustrates several embodiment of a notional schema for transferring the hot LCZ from an individual pond in the SGSP array to the corresponding LCZ's in the surrounding seven ponds.
Figure 6B:
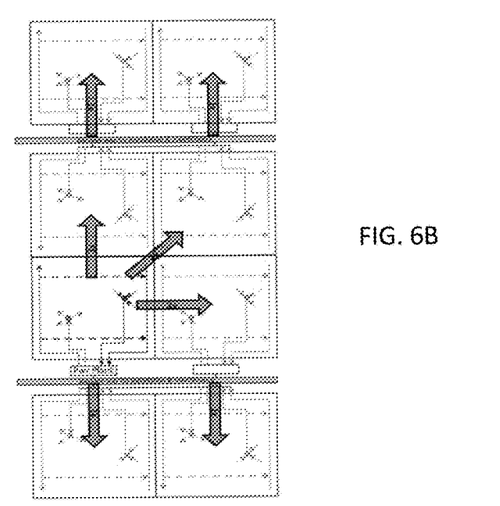
Figure 6C:
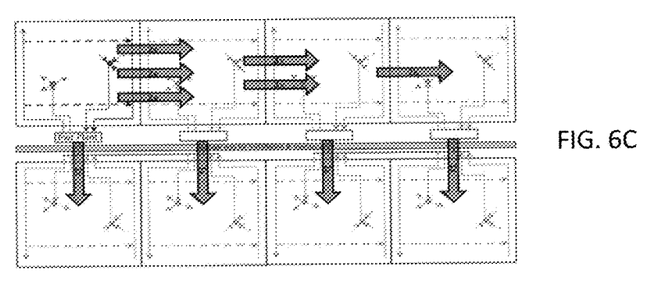

To do this optimized drain and rebuild of an individual pond the PRM incorporates GEM's modular design (FIG. 2). The LCZ and UCZ from the pond under repair are pumped to the corresponding zones of the surrounding ponds, as notionalized in FIG. 6. The left hand graphic in FIG. 6 illustrates the transfer of the LCZ for the general case of an internal pond within the SGSP array (note that the eight ponds shown in the graphic would generally equate to a 1 MW base-load SGSP system, i.e., four 250 kW heat engines as shown in FIG. 2). A simple unit comprised of hoses and a pump is used to transfer twice the nominal LCZ circulation flow from the pond under repair, indicated by the "2×" arrows in FIG. 6. There are generally three of these pump and hose units, to pump a total of six times the nominal LCZ flow to the surrounding three ponds. Then each of the surrounding three ponds redistributes half that inflow, i.e., one times the nominal LCZ flow, to its counterpart pond in the 250 kW module; no additional plumbing is needed for this "1×" distribution as the GEM 250 kW SGSP modules are equipped to allow withdrawing from one pond and returning LCZ flow to the counterpart (e.g., versus recirculating the same pond as is the nominal practice). Likewise the pond under repair pumps its LCZ flow to its counterpart. This PRM LCZ transfer schema enables the redistribution of the repair pond's LCZ to seven hot LCZ's in the surrounding ponds, thereby preserving most of the thermal energy in the LCZ of the pond under repair. The UCZ from the pond under repair is likewise redistributed to the surrounding ponds' UCZ's, but at roughly ⅓$^{rd}$ the circulation rate of the LCZ since there's less volume to transfer. For a typical 6.25 acre SGSP pond (flat bottom area, 50 acres for a base-load MW) and 1000 gpm LCZ circulation rate (e.g., for Pratt & Whitney 250 kW PureCycle unit using R134a refrigerant), the "7×" transfer rate would require approximately 26 hrs to transfer the 33.1 acre-feet of the pond's LCZ. In this time the UCZ is likewise transferred, leaving the to-be-refurbished NCZ standing alone in the repair pond. Such an LCZ-UCZ transfer schema requires approximately 10" of temporarily available freeboard in the surrounding seven ponds, well within the built-in freeboard of the array (see FIG. 5). The right hand graphics of FIG. 6 show the redistribution schema for an end-pond (top graphic) and for a corner-pond (bottom graphic) within the SGSP array. If the array size was smaller than 1 MW base-load (eight ponds) then additional freeboard would be required in the array pond design to accommodate the PRM transfer schema (e.g., for the same solar insolation requiring 50 acres of flat-bottom pond-collector for a base-load SGSP MW), a two-pond design (i.e., a single GEM 250 kW module) would require an additional 5.5' of temporary freeboard.

Once the to-be-refurbished NCZ is the only remaining material in the pond under repair it is available to be rebuilt in-situ. One method for doing this is to use mechanical evaporators to concentrate the remaining brine to near-saturation. Using typical evaporators[1] in a nominal humidity environment, it will require 15 evaporator units to concentrate the NCZ in five days (approximately 0.4 acres evaporation area per unit). With the remaining fluid in the repair pond concentrated brine, the NCZ can then be rebuilt by scan-injecting fresh water (e.g., as discussed in the literature[2]), or other salinity fluid being used for the UCZ in the operational area (e.g., brackish discharge from a desalination facility). The scan-injection volume for the nominal case being considered here is approximately 14.6 acre-feet requiring approximately 1.65 days to establish the gradient (at a nominal scan-injection rate of 2000 gpm total). The hot LCZ would then be recovered from the surrounding ponds (i.e., reverse the flow-arrows/equipment in FIG. 6) as well as the UCZ, thereby refurbishing the SGSP gradient. Enhancements to the PRM, e.g., to be determined in early GEM SGSP practice, include evaporating the NCZ to less-than fully saturated so that when it contacts the hot LCZ upon refill the upper boundary of the saturated LCZ "seats" the interface between the two layers via localized mixing promoted by the large temperature difference and momentum of the injected fluid.

[1] For example, using an SMI 420F (spray nozzle impinging on whirling impeller) mechanical evaporator.
[2] *Advancements in Salinity Gradient Solar Pond Technology Based on 16 Years of Operational Experience*, Huanmin Lu, Andrew H. P. Swift, Herbert D. Hein, Jr., John C. Walton; J. Solar Energy Eng., v. 126, p. 759-767, May 2004

Allowing for set up time[3], the entire rebuild for a single pond would take approximately 10 days (2.2 days drain/refill, 5 days concentrate, 1.6 days scan-inject, 1.2 days set-up and de-rig). Along with the required power for the evaporation and fluid transfer, the GEM PRM results in a ~1.1% parasitic, considered very workable from an SGSP commercialization standpoint.

[3] To be designed equipment, e.g., transfer pumps and hose units, diffusers, scan-injectors, handling equipment, etc.

FIG. 1 shows the basic workings of a Salinity Gradient Solar Pond (SGSP). A SGSP is a shallow, salt-gradient pond that enables the collection and storage of solar thermal energy, as noted in the figure. In the SGSP, solar energy is absorbed by the pond's bottom which in turn heats the adjacent salt-saturated fluid (the "Lower Convective Zone", or LCZ, in FIG. 1). Since the LCZ is heavier than the layers above it due to its higher salinity, the heated fluid cannot rise in the pond and cool, like a normal pond, but rather remains on the bottom, getting hotter as it stores more solar thermal energy. Over time, typically several months from initial construction, as the LCZ stores more and more solar thermal energy, the brine temperature will approach boiling. This collected and stored solar thermal energy can be withdrawn (pumped hot brine) as process heat which can be used to generate electricity using an off the shelf, low-temperature heat engine. Acting as a large-scale solar thermal battery, the SGSP can collect and store heat, and deliver power at an average, uniform rate (base-load), or can deliver power on an as needed basis (on-demand) giving distribution control of the power output rather than being forced to produce power solely when the wind blows or the sun shines, making SGSP systems many times more effective than intermittent renewables.

FIGS. 2A-2C depicts the Good Earth Mechanics (GEM) 250 kW Commercial SGSP Module, which uses two pond units for each module. The ponds are bermed impoundments versus excavated holes, where the dirt from the pond centers is used to form the berms. The GEM SGSP systems are modularly extensible: the GEM SGSP power system site can be as small as 250 kW, or scaled up to 100's of MW's, by simply adding more SGSP modules. A cutaway of the GEM SGSP system in figure shows how a typical off-the-shelf, low-temperature Organic Rankine Cycle (ORC) heat engine circulates both the pond's hot bottom brine and the cool surface water. The hot brine is the thermal source and the cool water serves as the ORC heat sink; it's the temperature difference between the bottom and the top of the SGSP system that drives the heat engine.

Figure 3:
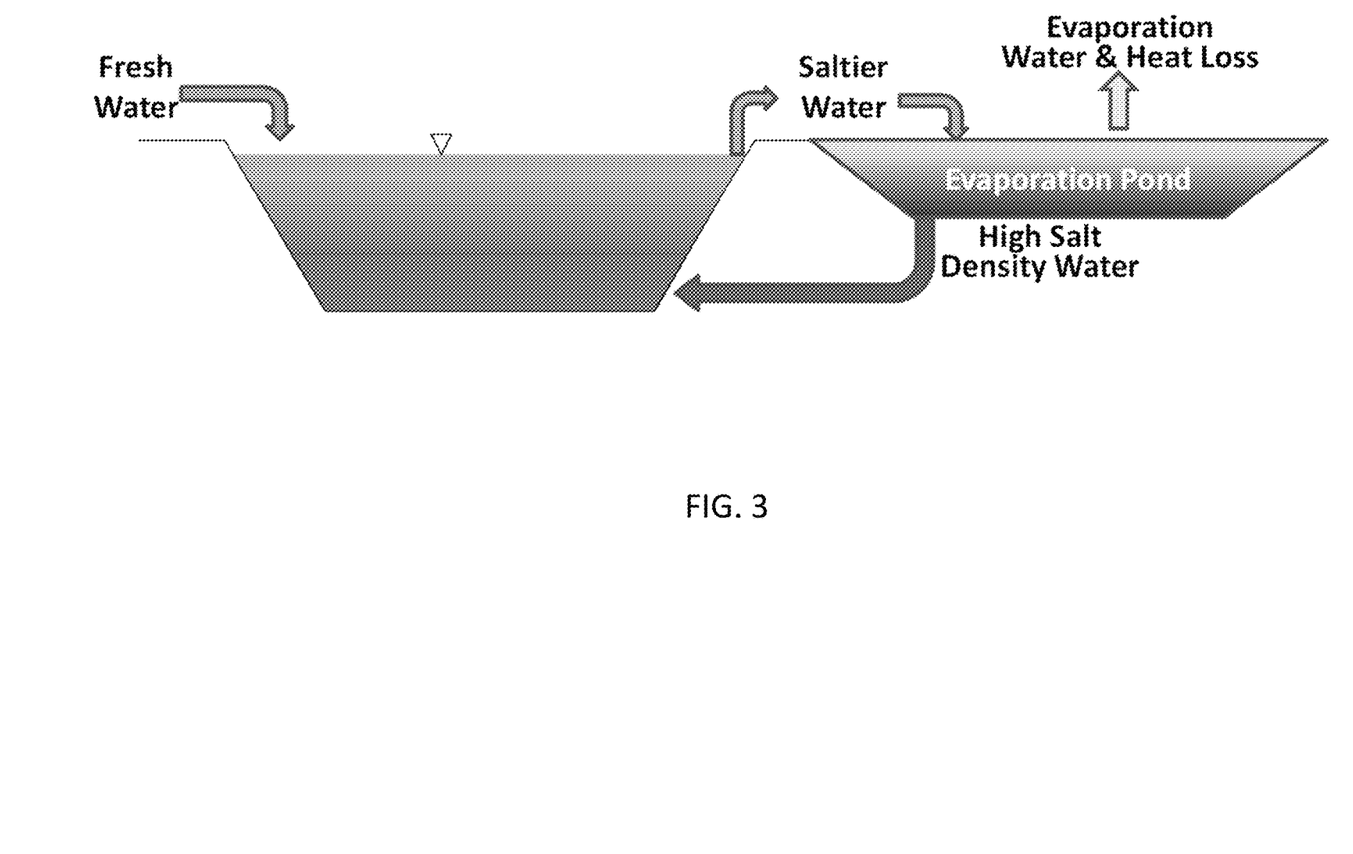
FIG. 3 illustrates an exemplary known in the art practiced method for controlling a SGSP gradient termed the "Surface Wash Method".

FIG. 3 shows the conventionally practiced method for controlling the SGSP gradient termed the "Surface Wash Method". In the Surface Wash method the salt is allowed to diffuse upward to the surface layer. As the surface layer gets saltier, it is replaced with fresh water, or "washed". The displaced salty surface water is evaporated to concentrated salt brine in a separate evaporation pond and then returned to the SGSP bottom. This method, while workable for SGSP demonstration work and the typical gradient maintenance practice heretofore, is not practical for large scale SGSP commercialization due to the additional land requirement and the higher water and heat losses required to practice the method. The Pond Rolling Method is superior as it minimizes water, heat loss, required land, and costs compared with the Surface Wash method.

FIG. 4 depicts the basic operation of a generic Falling Pond Device in operation with an SGSP system to maintain the salinity gradient. Due to the salinity stratification in the SGSP the upward diffusion of salt is a natural consequence. Controlling the salinity gradient in SGSP systems is vital to their reliable and efficient operation. One method proposed for controlling the salinity gradient is the Falling Pond method depicted in the figure. A "Falling Pond Device" shown in the figure is intended to continuously maintain the salinity gradient in-place by extracting water from the saturated brine on the bottom of the pond and moving it to the top; this action causes the pond's layers to be continuously cycled downward, or "fall". This rate of fall, or downward velocity, can be controlled to match the rate of upward diffusion of salt in the SGSP, thereby maintaining the gradient in-place. GEM has previously disclosed a system and practice for applying the Falling Pond method.

FIG. 5 is a cutaway of a GEM SGSP system, showing the typical dimensions for the pond's three layers: the Upper Convective Zone (homogeneous fresh to low-salinity top zone); the Non-Convective Layer (salt, temperature, and density stratified zone which acts as a barrier for mass transport of heat within the SGSP system); and the Lower Convective Zone (homogeneous salt saturated lower zone which collects and stores the solar thermal energy). The figure also shows the available freeboard for a typical GEM SGSP system array, which is used as shared temporary storage when rebuilding the gradients of individual ponds within the GEM SGSP array.

FIGS. 6A-6C shows notional schema for transferring the hot LCZ from an individual pond in the GEM SGSP array to the corresponding LCZ's in the surrounding seven ponds. This schema allows for retaining most of the heat in the LCZ of the pond under repair while minimizing the dirt work within the array (e.g., a typical GEM SGSP array will temporarily utilize less than 10" of the available freeboard in FIG. 5 for storing the UCZ and LCZ of a pond that is having its NCZ refurbished).

The present invention, a Pond Rolling Method, provides an efficient means for practicing gradient maintenance in an SGSP power system. The Pond Rolling Method is more efficient than previously practiced methods for SGSP gradient maintenance, e.g., the Surface Wash method, and that improved efficiency is essential for the commercial practice of SGSP power systems. The commercialization of the SGSP technology is vital to the renewable energy industry, particularly as intermittent renewables are leading to grid management issues and increased costs. The SGSP systems collect and store heat, and are able to deliver power at an average, uniform rate (base-load), or on an as needed basis (on-demand) giving distribution control of the power output rather than being forced to produce power solely when the wind blows or the sun shines. This feature, along with other synergistic benefits which GEM has developed (e.g., large-scale salt sink for environmental remediation), make SGSP systems many times more effective than intermittent renewables. The GEM team is presently engaged in the commercial launch of their SGSP technology and the disclosed invention herein is crucial to that commercial launch. The Pond Rolling Method, along with the previously disclosed Falling Pond system and practice to enable the Falling Pond Method, gives GEM positive control of the salinity gradient for commercial practice of the SGSP technology.

In conclusion, herein is presented a system and method for maintaining the salinity gradient in a Salinity Gradient Solar Pond (SGSP). The invention is illustrated by example in the flow diagrams and figures, and throughout the written description. It should be understood that numerous variations are possible, while adhering to the inventive concept. Such variations are contemplated as being a part of the present invention.

What is claimed is:

1. A method to refurbish a non-convective zone in a salinity gradient solar pond comprising the steps of:
   draining completely an upper convective zone and a lower convective zone from a salinity gradient solar pond utilizing a plurality of transfer units wherein only the non-convective zone remains in the salinity gradient solar pond;
   storing the drained upper convective zone in a corresponding upper convective zone of at least one surrounding pond and the drained lower convective zone in a corresponding lower convective zone of the at least one surrounding pond;
   refurbishing the non-convective zone of the salinity gradient solar pond; and
   returning the upper convective zone and the lower convective zone from the at least one surrounding pond to the salinity gradient solar pond via the plurality of transfer units.

2. The method of claim 1 further comprising the step of:
   conditioning a lower part of the refurbished non-convective zone to enable a preferred gradient interface between the lower convective zone and the non-convective zone once the lower convective zone is returned to the pond being refurbished and partially mixes with the cooler, refurbished non-convective zone.

3. The method of claim 1 further comprising the step of:
   creating an SGSP array comprising: at least two salinity gradient solar ponds, wherein one or more of a surrounding solar ponds in the SGSP array serves to store the lower and upper convective zone of the solar pond being refurbished thereby minimizing a requisite freeboard in the array of surround ponds and a transfer time of the lower and upper convective zones.

4. The method of claim 1, wherein each transfer unit comprises at least one device selected from the group consisting of: a plurality of hoses, a plurality of pipes, and a plurality of pumps.

\* \* \* \* \*